United States Patent

[11] 3,571,683

| [72] | Inventors | Claudio Prezzi<br>Yverdon;<br>Giovanni Odone, LaRosiz Surlausane,<br>Switzerland |
|---|---|---|
| [21] | Appl. No. | 701,694 |
| [22] | Filed | Jan. 30, 1968 |
| [45] | Patented | Mar. 23, 1971 |
| [73] | Assignee | Paillard S. A.<br>Vaud, Switzerland |
| [32] | Priority | Feb. 17, 1967 |
| [33] | | Switzerland |
| [31] | | 2338/67 |

[54] SERVOMECHANISM WITH DRIVING ROTOR WINDING AND BRAKING ROTOR WINDING
11 Claims, 2 Drawing Figs.

[52] U.S. Cl. .................................................. 318/258,
318/275, 318/382, 318/368
[51] Int. Cl. ...................................................... H02p 5/04

[50] Field of Search ........................................... 318/258,
269, 380, 369, 20.410, 275, 382, 368

[56] References Cited
UNITED STATES PATENTS

| 2,818,542 | 12/1957 | Linsley et al. ................. | 318/269 |
| 2,965,827 | 12/1960 | Hohne, Jr. ..................... | 318/380 |
| 3,188,547 | 6/1965 | Zelina ........................... | 318/380 |
| 3,189,811 | 6/1965 | King .............................. | 318/269 |
| 2,940,028 | 6/1960 | Parzen ....................... | 318/448(20.410) |

Primary Examiner—Oris L. Rader
Assistant Examiner—K. L. Crosson
Attorneys—Emory L. Groff and Emory L. Groff, Jr.

ABSTRACT: A commutator-type electric motor with two windings, one of which is energized by a control current, for driving the motor, and the other of which furnishes a braking torque, whereby the motor is stopped without overshooting.

3,571,683

PATENTED MAR 23 1971

INVENTORS
CLAUDIO PREZZI
GIOVANNI ODONE
BY Emery L. Groff Jr.
ATTORNEY

SERVOMECHANISM WITH DRIVING ROTOR WINDING AND BRAKING ROTOR WINDING

BACKGROUND OF THE INVENTION

The invention relates to servomechanisms employing an electric motor powered by a current that is the function of a control signal. Servomechanisms of this kind are widely utilized in many different fields of technology.

Since the resisting torque offered to an electric motor is relatively weak, it is difficult to obtain, in a simple manner, a stable servomechanism, because when the desired position is reached, and the current to the motor is cut off, the inertia of the moving parts causes the motor to continue to turn and to overshoot the desired position, such that the motor must be reversed to correct the resulting error. This drawback is particularly bothersome in certain applications, so that, up to the present time, the introduction of servomechanisms of this kind for the control, for example, of the diaphragms of still and cinecameras has met with serious obstacles.

SUMMARY OF THE INVENTION

The present invention relates to a servomechanism that is stable in operation because the electric motor thereof is effectively braked.

An object of the invention is a servomechanism having an electric motor powered by a control signal, which motor is braked at least from the time that the desired position is neared and until the motor is stopped.

This object, and other objects, of the invention will be apparent from the following detailed description.

BRIEF DESCRIPTION OF THE DRAWING

The invention will be described, with reference to the figures of the accompanying drawing, wherein.

DESCRIPTION OF THE PREFERRED EMBODIMENTS

Figure 1:
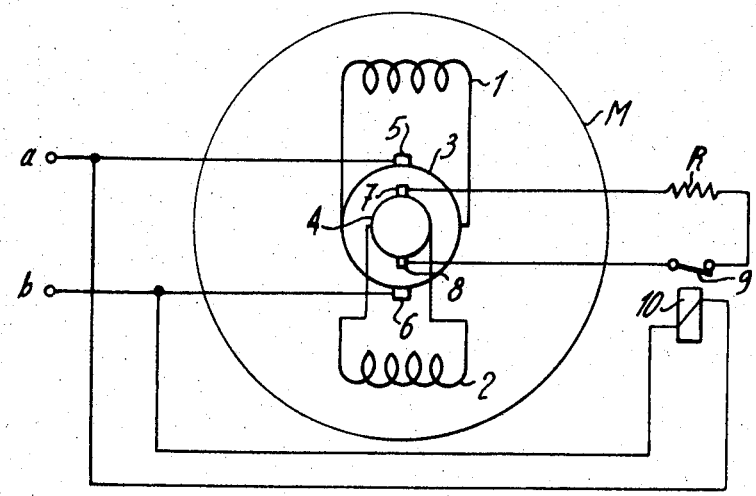
FIG. 1 is a circuit diagram of a first embodiment of the invention.

With reference to FIG. 1, the servomechanism includes a commutator-type motor M, the exciting field of which is supplied by a permanent magnet. The motor has the peculiarity of incorporating two windings 1 and 2 on its rotor which are connected to respective commutators 3 and 4, shown diagrammatically in FIG. 1.

The winding 1 is fed from the output of a control circuit, not shown, that furnishes a control current that is a function of a control signal. In the case where the motor M drives the diaphragm of a cinecamera, the control circuit supplies a current, of which the direction and amplitude depend on the difference between the actual opening of the diaphragm and that opening it should have to expose the film correctly. This control current is obtained in a known manner with the aid of at least one photoelectric transducer. The output of the control circuit is connected to the terminals $a$ and $b$, which are respectively connected to the brushes 5 and 6 of the commutator 3 of the winding 1.

The second winding 2 is connected to a resistance circuit by means of the commutator 4 and its brushes 7 and 8. These two brushes are connected to a resistance $R$ in series with a contact 9 of a relay 10. The contact is normally closed and opens when the relay 10, the winding of which is connected to the terminals $a$ and $b$, is fed a current of sufficient magnitude.

When the strength of the illumination measured indicates an appreciable discrepancy between the size of the diaphragm opening and the size that the opening should be, an error or control voltage is supplied to the terminals $a$ and $b$, causing, on the one hand, the motor M to rotate in the correct direction, and, on the other hand, the relay contact 9 to open. As the diaphragm approaches its correct opening, the voltage at the terminals $a$ and $b$ declines. As soon as this voltage falls below a given value, the relay winding is no longer sufficiently energized, and the contact 9 closes. From the point of view of the winding 1, the contact 9 closes when the current in the winding 1 falls below a given value. The winding 2 feeds to the resistance $R$ a current that is proportional to the voltage induced in this winding in consequence of the rotation of the motor. The result is a torque that brakes the motor, the value of the torque being substantially proportional to the motor's speed of rotation. In this way, when the motor has reached the correct position, and the voltage at the terminals $a$ and $b$ is therefore zero, the motor is virtually stopped, thanks to the braking couple, whereby the motor does not "overshoot" the position that must be held.

This embodiment is advantageous, because the electrical braking torque is applied to the motor M only when the rotation of the latter is about to reach the correct position. The braking torque does not oppose the motor's rotation when the motor must cause a considerable change in the aperture of diaphragm and, indeed, not until the motor has very nearly rotated to the desired position.

The embodiment just described admits of various modifications that fall within the scope of the invention. For example, the resistance 10 instead of being a discrete resistor may comprise the resistance of the relay contact 9 and its connections to the winding 2. In another variation of the embodiment, the relay 10 and its contact 9 can be replaced by another kind of switch controlled by the voltage supplied to the terminals $a$ and $b$. The switch, for example, can be a transistor normally biased to conduct, and rendered nonconductive by the control voltage at the terminals $a$ and $b$, when this voltage falls below a given value.

Figure 2:
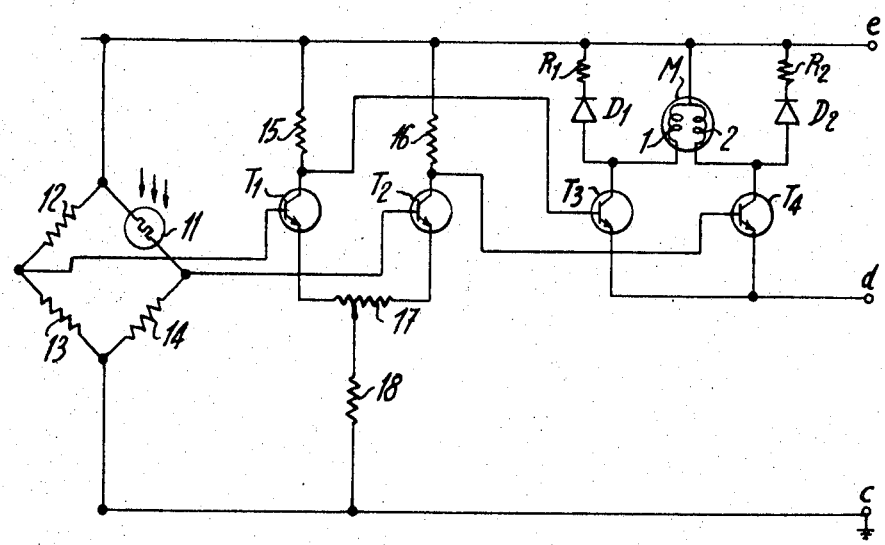
FIG. 2 is a circuit diagram of a second embodiment of the invention.

The servomechanism of FIG. 2 is also intended to control the diaphragm of a still camera or of a cinecamera. A photoelectric transducer 11 is exposed to the illumination that passes through the camera objective, at a position where the quantity of illumination is controlled by the diaphragm of the objective. The transducer 11 is connected as one arm of a bridge, the other arms being the resistors 12, 13, and 14. The bridge is connected to a DC control voltage source (not shown) having the terminals $c$, $d$, and $e$, the latter terminal being positive with respect to the first two.

The bridge output is connected to a single-stage differential amplifier having the two transistors $T_1$ and $T_2$, the collectors of which are connected by respective resistors 15 and 16, of equal ohmage, to the terminal $e$, and the emitters of which are connected to the terminal $c$ via a balancing potentiometer 17 and a resistor 18. The bridge output is connected to the bases of the transistors $T_1$ and $T_2$.

The collectors of these two transistors are connected to the respective bases of two power transistors $T_3$ and $T_4$, of which the emitters are connected to the terminal $d$. The potential of this terminal lies between those of the terminals $c$ and $e$. Each collector of the transistors $T_3$ and $T_4$ is connected to a respective winding, 1 and 2, of a motor M of the same type as employed in the embodiment of FIG. 1.

In addition, each winding 1 and 2 is shunted by a respective resistor $R_1$ and $R_2$, connected in series with a respective diode $D_1$ and $D_2$. The polarity of these diodes prevents the passage of current from the control voltage source.

The values of the circuit components are so chosen that, in accordance with the correction that must be made, one or the other of the transistors $T_3$ and $T_4$ is rendered conductive, so as to cause the motor M to rotate in the one or the other direction. This is obtained by choosing a different winding direction for each of the windings 1 and 2. In this way, when the diaphragm opening is being changed, one of the windings is fed a voltage, whereas the other is not. Instead, the voltage induced in the other winding causes a current to be conducted by the diode, $D_1$ or $D_2$, and by the resistor, $R_1$ or $R_2$, associated with the winding having the induced voltage. In this manner, there is obtained, as in the previous embodiment, an electrical braking torque, the value of which varies as a function of the rotational speed of the motor. This couple is present at all motor speeds, and not only when the motor is near its rest position.

Although the preferred embodiments of the invention have been described, the scope of, and the breadth of protection afforded to, the invention are limited solely by the appended claims.

We claim:

1. A servomechanism including, an electric motor of the commutator type having a rotor with a pair of rotor windings, separate commutator means connected to each of said rotor windings, circuit means adapted to receive a DC driving signal current and connected to one of said rotor windings through the respective commutator means for rotating said rotor in at least one direction, and a resistance circuit connected to the other of said rotor windings through the other respective commutator means and operative upon rotation of the rotor to produce an electrical torque on said rotor for braking said rotor at least when the DC driving signal current in said one of said rotor windings drops below a given value.

2. The servomechanism as defined in claim 1, wherein said resistance circuit includes at least one switch means, said switch means connected to said circuit means and operated by the driving signal current, whereby said resistance circuit is closed by said switch means as soon as the driving signal current falls below a given value.

3. The servomechanism as set forth in claim 2 wherein as soon as said resistance circuit is closed by said switch means, said resistance circuit produces in said other of said rotor windings the electrical braking torque.

4. The servomechanism as defined in claim 1, wherein the driving signal current is dependent on the difference between the desired opening of a camera diaphragm and the actual opening of the diaphragm, and the motor controls the diaphragm opening.

5. A servomechanism including an electric motor of the commutator type having a rotor with a pair of rotor windings, separate commutator means connected to each of said rotor windings, circuit means adapted to receive a driving signal current and connected to each said rotor winding through the respective separate commutator means for energization by the driving signal current, each said rotor winding disposed on said rotor such that respective energization causes the motor to rotate in a respective different direction, a respective resistance circuit shunting each said rotor winding through the respective commutator means, and upon rotation of the rotor by one of said rotor windings the resistance shunting circuit of the other of said rotor windings operative to produce an electrical torque on said rotor for braking said rotor at least when the driving signal current in said one of said rotor windings drops below a given value.

6. The servomechanism as defined in claim 5, including a respective unidirectional conductor connected in series with each said respective shunt resistance for preventing driving signal current from flowing through the respective said shunt resistance.

7. The servomechanism as defined in claim 6, including a respective transistor connected between each said rotor winding and said circuit means for enabling energization of the respective said rotor winding when the respective transistor conducts, and control circuit means connected to said circuit means and adapted to produce the driving signal current to bias each said transistor to conduct or not to conduct in dependence on the direction in which the motor is to turn.

8. The servomechanism as defined in claim 7, wherein said control circuit means includes a differential amplifier having a pair of output terminals respectively connected to said respective transistors.

9. The servomechanism as set forth in claim 8, in which said control circuit means includes an electrical bridge having an output circuit connected to said differential amplifier for driving the same, a source of potential energizing said electrical bridge, said electrical bridge including a photoelectric element whereby said electrical bridge is operative to produce a driving signal current in the said output circuit dependent on the amount of illumination received by said photoelectric element.

10. The servomechanism as defined in claim 9, wherein said source of potential includes a source of reference potential and, with respect to said source of reference potential, a source of maximum potential and a source of an intermediate potential, said electrical bridge is connected across said sources of maximum and reference potentials, and said pair of rotor windings are connected across said sources of maximum and intermediate potentials via said respective transistors.

11. A servomechanism including an electric motor of the commutator type having a rotor with a pair of rotor windings, separate commutator means connected to each of said rotor windings, circuit means adapted to receive a driving signal current and connected to one of said rotor windings through the respective commutator means for rotating said rotor in at least one direction, a resistance circuit connected to the other of said rotor windings through the other respective commutator means and operative upon rotation of the rotor to produce an electrical torque on said rotor for braking said rotor at least when the driving signal current in said one of said rotor windings drops below a given value, a relay, said relay including a winding connected to said circuit means and adapted to be energized by the driving signal current, said relay including a contact connected in series with said resistance circuit, and said contact being closed to complete said resistance circuit when the driving signal current falls below a given value.